US010168222B2

(12) United States Patent
Goruganthu et al.

(10) Patent No.: US 10,168,222 B2
(45) Date of Patent: Jan. 1, 2019

(54) THERMAL DETECTOR ARRAY CONFIGURED TO DETECT THERMAL RADIATION FROM THE INTEGRATED CIRCUIT

(71) Applicant: QUALCOMM Incorporated, San Diego, CA (US)

(72) Inventors: Rama Rao Goruganthu, Austin, TX (US); Ali Akbar Merrikh, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/474,914

(22) Filed: Mar. 30, 2017

(65) Prior Publication Data
US 2018/0283959 A1 Oct. 4, 2018

(51) Int. Cl.
G01J 5/10 (2006.01)
G01J 5/08 (2006.01)
G01J 5/02 (2006.01)
G01J 5/06 (2006.01)

(52) U.S. Cl.
CPC ............... *G01J 5/10* (2013.01); *G01J 5/025* (2013.01); *G01J 5/061* (2013.01); *G01J 5/0806* (2013.01); *G01J 5/0809* (2013.01); *G01J 2005/106* (2013.01)

(58) Field of Classification Search
CPC .... G01J 5/10; G01J 5/025; G01J 5/061; G01J 5/0806; G01J 5/0809; G01J 2005/106
See application file for complete search history.

(56) References Cited

U.S. PATENT DOCUMENTS

| 4,975,766 A * | 12/1990 | Umezawa ................ G01K 1/16 257/697 |
| 6,321,175 B1 * | 11/2001 | Nagaraj .................. G01K 7/42 257/467 |
| 6,359,276 B1 | 3/2002 | Tu |
| 6,787,870 B2 * | 9/2004 | Wienand ................ G01K 7/183 257/467 |
| 8,110,883 B2 | 2/2012 | Ward et al. |
| 8,513,605 B2 | 8/2013 | Beratan |
| 8,704,179 B2 | 4/2014 | Talghader |
| 8,757,874 B2 * | 6/2014 | Becker .................. G01K 7/023 374/179 |
| 8,975,583 B2 | 3/2015 | Tinkler et al. |
| 2005/0114068 A1 * | 5/2005 | Chey ..................... G01K 1/026 702/130 |
| 2005/0230841 A1 * | 10/2005 | Walk ................. H01L 23/49827 257/778 |

OTHER PUBLICATIONS

Tissot J.L., et al., "Uncooled Microbolometer Detector: Recent Developments at ULIS", Opto-Electronics Review, Mar. 2006, vol. 14, Issue 1, pp. 25-32.

* cited by examiner

*Primary Examiner* — Christine S Kim
(74) *Attorney, Agent, or Firm* — Muncy, Geissler, Olds & Lowe, P.C./Qualcomm

(57) ABSTRACT

An apparatus is disclosed that comprises an integrated circuit and a thermal detector array configured to detect thermal radiation from the integrated circuit. A method is disclosed that comprises providing an integrated circuit and disposing a thermal detector array so as to detect thermal radiation from the integrated circuit. Another apparatus is disclosed that comprises means for processing and means for detecting thermal radiation from the means for processing.

24 Claims, 12 Drawing Sheets

THERMAL DETECTOR ARRAY CONFIGURED TO DETECT THERMAL RADIATION FROM THE INTEGRATED CIRCUIT

INTRODUCTION

Aspects of this disclosure relate generally to integrated circuits (abbreviated as "IC"), and more particularly to thermal detector arrays configured to detect thermal radiation from the IC.

Using new fabrication technologies and innovative designs, ICs have become smaller even as processing power has increased. However, as IC density increases, the amount of dissipated power per unit of area also increases. As a result, heat can accumulate across the IC. High temperatures can cause processing to slow down, which limits the utility of high-density ICs.

Conventionally, temperature sensors may be placed on an IC. As a result, heat accumulation can be detected, and action can be taken to reduce temperature and/or preserve processing speed. However, a temperature sensor may generate localized temperature data that is only relevant to the particular portion of the IC at which the temperature sensor is disposed. As a result, temperature determinations are imprecise. To improve temperature determinations, more temperature sensors can be dispersed throughout the IC. However, temperature sensors take up space on the IC and complicate the design of the circuit layout.

Accordingly, new approaches are needed for detection of heat accumulation on ICs.

SUMMARY

The following summary is an overview provided solely to aid in the description of various aspects of the disclosure and is provided solely for illustration of the aspects and not limitation thereof.

In one aspect, the present disclosure provides an apparatus. The apparatus may comprise an integrated circuit and a thermal detector array configured to detect thermal radiation from the integrated circuit.

In another aspect, the present disclosure provides a method. The method may comprise providing an integrated circuit and disposing a thermal detector array so as to detect thermal radiation from the integrated circuit.

In yet another aspect, the present disclosure provides another apparatus. The apparatus may comprise means for processing and means for detecting thermal radiation from the means for processing.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the disclosure are disclosed in the following description and related drawings directed to specific aspects of the disclosure. Alternate aspects may be devised without departing from the scope of the invention. Additionally, well-known elements of the invention will not be described in detail or will be omitted so as not to obscure the relevant details of the invention.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on".

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As used herein, the term "vertical" is generally defined with respect to a surface of a substrate or carrier upon which a semiconductor package is formed. The substrate or carrier will generally define a "horizontal" plane, and a vertical direction approximates a direction that is substantially normal to the horizontal plane. Moreover, it will be understood that terms such as "top" and "bottom", "left" and "right", "vertical" and "horizontal", etc., are relative terms used strictly in relation to one another, and do not express or imply any relation with respect to gravity, a manufacturing device used to manufacture the components described herein, or to some other device to which the components described herein are coupled, mounted, etc.

Figure 1:
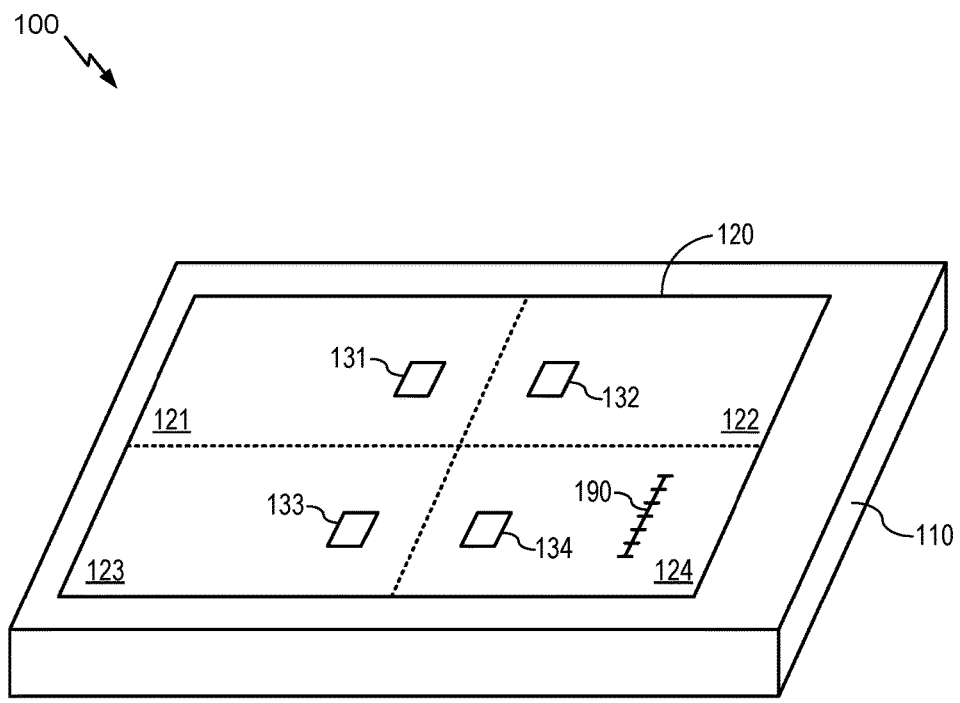
FIG. 1 generally illustrates a conventional IC package.

FIG. 1 generally illustrates a conventional IC package 100. The IC package 100 may include an IC substrate 110 and an IC 120. In order to detect heat accumulation, one or more temperature sensors 131, 132, 133, 134 may be disposed on the IC substrate 110 and/or within the IC 120. As will be understood from FIG. 1, the IC 120 may be divided into a plurality of IC sections 121, 122, 123, 124, and a temperature sensor may be disposed in each. For example, a first temperature sensor 131 may be disposed in a first IC section 121, a second temperature sensor 132 may be disposed in a second IC section 122, a third temperature sensor 133 may be disposed in a third IC section 123, and a fourth temperature sensor 134 may be disposed in a fourth IC section 124.

If heat accumulation is detected by one or more of the temperature sensors 131, 132, 133, 134, then action can be taken to reduce temperature and/or preserve processing speed. For example, if excessive heat accumulation is detected by the first temperature sensor 131, the scheduling of processing tasks may be shifted to other IC sections, such as the second IC section 122, the third IC section 123, and/or the fourth IC section 124.

However, the temperature sensors 131, 132, 133, 134 may generate localized temperature data that does not detect heat accumulation with sufficient speed or accuracy. For example, heat may accumulate in a circuit component 190, as depicted in FIG. 1. The circuit component 190 may be, for example, a buffer amplifier. This heat accumulation may be detected by the fourth temperature sensor 134, but it may be underestimated due to the distance between the fourth temperature sensor 134 and the circuit component 190. Accordingly, the temperature sensors 131, 132, 133, 134 may not succeed in preventing a processing slowdown.

Figure 2:
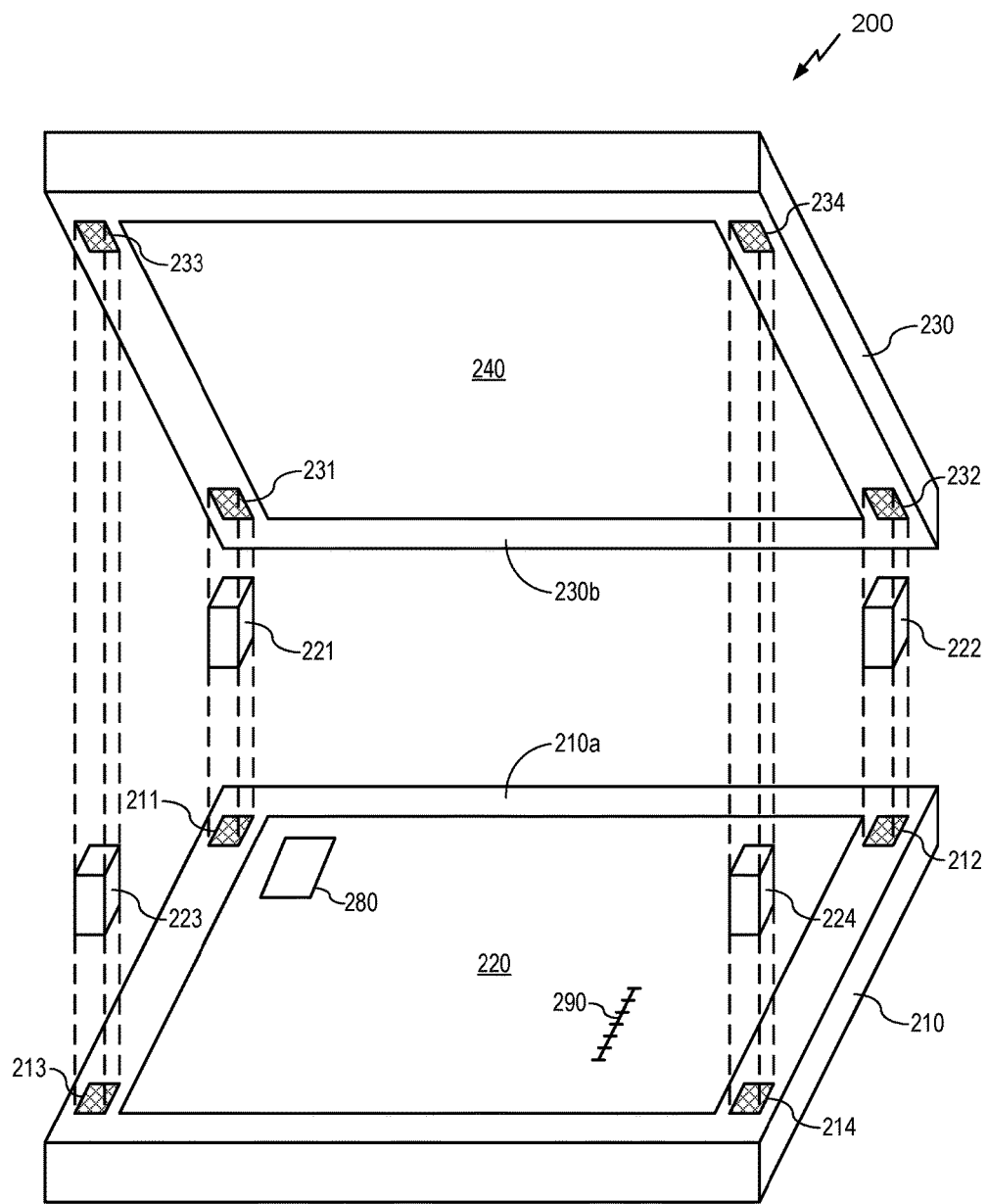
FIG. 2 generally illustrates an IC package in accordance with aspects of the disclosure.

FIG. 2 generally illustrates an IC package 200 in accordance with aspects of the disclosure. The IC package 200 depicted in FIG. 2 may include an IC substrate 210 and an IC 220. The IC 220 may be disposed on an IC substrate top surface 210a of the IC substrate 210.

The IC package 200 may further include a thermal detector array substrate 230 and a thermal detector array 240. The thermal detector array 240 may be disposed on a thermal detector array substrate bottom surface 230b of the thermal detector array substrate 230. The thermal detector array 240 may be configured to detect thermal radiation that radiates from the IC 220. In some implementations, the thermal detector array 240 may include a microbolomoter array.

The IC package 200 may further include one or more spacers 221, 222, 223, 224. The one or more spacers 221, 222, 223, 224 may be disposed on the IC substrate top surface 210a of the IC substrate 210. Accordingly, the IC substrate 210 may include respective footprints 211, 212, 213, 214 upon which respective bottom surfaces of the one or more spacers 221, 222, 223, 224 are disposed.

The one or more spacers 221, 222, 223, 224 may be disposed between the IC substrate top surface 210a and the thermal detector array substrate bottom surface 230b of the thermal detector array substrate 230. Accordingly, the thermal detector array substrate 230 may include respective footprints 231, 232, 233, 234 upon which respective top surfaces the one or more spacers 221, 222, 223, 224 are disposed.

The one or more spacers 221, 222, 223, 224 may have a height that is selected so that the thermal detector array 240 will be disposed at a particular distance from the IC 220. For example, a distance between a top surface of the integrated circuit and a bottom surface of the thermal detector array may be within a range of distances between twenty micrometers and one-thousand micrometers. Alternatively, a distance between a top surface of the integrated circuit and a bottom surface of the thermal detector array may be within a range of distances between twenty micrometers and one-hundred micrometers. This distance may be selected to enable proximity focusing. For example, the thermal detector array 240 may be placed at a distance from the IC 220 such that each pixel in the thermal detector array 240 resolves a particular portion of the IC 220.

Appropriate placement of the thermal detector array 240 from the IC 220 may enable radiometric temperature measurements across the die. The radiometric temperature measurements may render temperature sensors (analogous to the temperature sensors 131, 132, 133, 134) unnecessary. The thermal detector array 240 may have high spatial resolution. For example, each pixel of the thermal detector array 240 may correspond to a particular complementary portion of the IC 220.

The IC 220 may further include a temperature control module 280. The temperature control module 280 may be configured to control a temperature profile of the IC 220. For example, the temperature control module 280 may be configured to receive a thermal detection signal from the thermal detector array 240. The thermal detection signal may indicate an amount and/or location of thermal radiation detected by the thermal detector array 230. The temperature control module 280 may be further configured to generate a temperature control signal in response to receiving of the thermal detection signal, and transmit the temperature control signal to the IC 220, a portion or component of the IC 220, or any combination thereof.

For example, heat may accumulate in a circuit component 290, for example, a circuit component 290, as depicted in FIG. 2. This heat accumulation may be detected by the thermal detector array 240. Moreover, the thermal detector array 240 may detect the heat accumulation instantly and with a high degree of accuracy as to the position and amount of the heat accumulation. The thermal detector array 240 may then generate the thermal detection signal and transmit the thermal detection signal to the temperature control module 280. The thermal detection signal may take the form of a thermal map of the IC 220. The thermal map may have a high spatial resolution, as described previously, and may indicate that the circuit component 290 are associated with excessive heat accumulation. For example, the amount of heat accumulation indicated by the thermal detection signal may exceed a heat accumulation threshold. The heat accumulation threshold may be, for example, an amount of heat accumulation that causes a significant slowdown of processing tasks.

The transmitting of the thermal detection signal from the thermal detector array 240 to the temperature control module 280 may be performed in any suitable manner. In some implementations, the temperature control module 280 may be disposed on the thermal detector array substrate 230 and the thermal detection signal may be transmitted to the temperature control module 280 via one or more conductive couplings. In other implementations, the temperature control module 280 may be disposed on the IC substrate 210 or implemented within the IC 220. In this case, the thermal detection signal may be transmitted from the thermal detector array substrate 230 to the IC substrate 210 via the one or more spacers 221, 222, 223, 224. For example, one or more conductive couplings may be embedded in one or more of the one or more spacers 221, 222, 223, 224. In yet other implementations, the one or more spacers 221, 222, 223, 224 are formed wholly or partly of insulating material, such that the one or more spacers 221, 222, 223, 224 do not conduct heat or electricity. Accordingly, the thermal detection signal may be transmitted optically or wirelessly from the thermal detector array 240 to the temperature control module 280.

The transmitting of the temperature control signal from the temperature control module 280 to the IC 220 may also be performed in any suitable manner. If the temperature control module 280 is disposed on the thermal detector array substrate 230, as noted above, then the temperature control signal may be transmitted via conductive couplings in the one or more spacers 221, 222, 223, 224 or using optical or wireless protocols (as described above). If the temperature control module 280 is disposed on the IC substrate 210 or included in the IC 220, then the temperature control signal may be transmitted via conductive couplings within the IC substrate 210 and/or the IC 220.

The temperature control signal may include one or more instructions for reducing heat generation. For example, the temperature control module 280 may direct the IC 220 to limit processing tasks and/or transfer processing tasks from one portion of the IC 220 to another portion of the IC 220 (for example, from a hot portion to a cooler portion). Additionally or alternatively, the temperature control signal may include one or more instructions for directing an active coolant system. As will be discussed in greater detail below, the active coolant system may be configured to direct cooling fluid through the IC 220 or selected portions of the IC 220. The cooling fluid may absorb heat and carry the heat to a different portion of the IC substrate 210.

Figure 3:
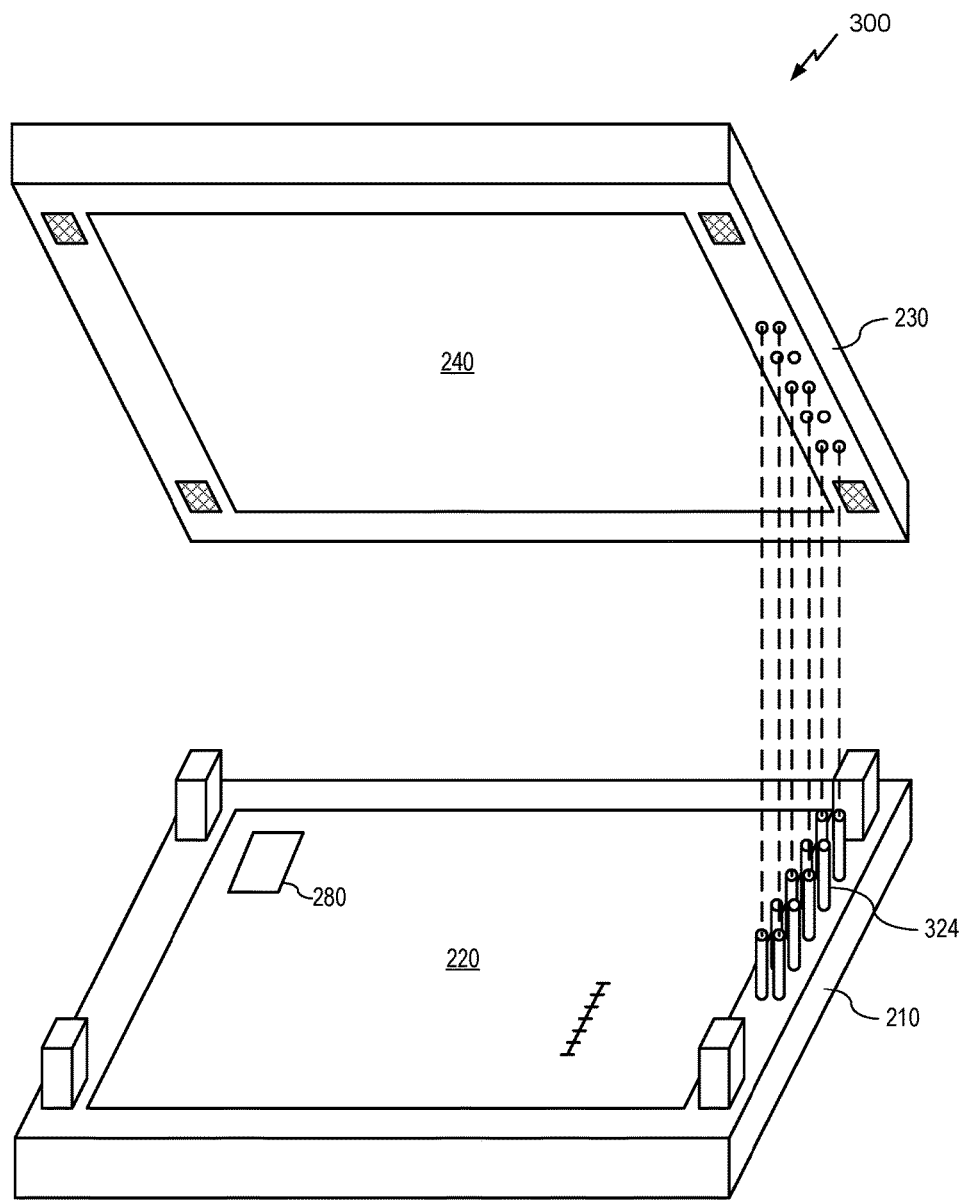
FIG. 3 generally illustrates another IC package in accordance with aspects of the disclosure.

FIG. 3 generally illustrates another IC package 300 in accordance with aspects of the disclosure. The IC package 300 may have a number of components in common with the IC package 200 depicted in FIG. 2. For example, the IC package 300 may include the IC substrate 210, the IC 220, the thermal detector array substrate 230, the thermal detector array 240, and the temperature control module 280. For clarity of illustration, reference numerals for other common components, such as the one or more spacers 221, 222, 223, 224, have been omitted. The IC package 300 differs from the IC package 200 in that it includes couplings 324. The couplings 324 may be electrically conductive couplings.

The couplings 324 may be distinct from the one or more spacers 221, 222, 223, 224, and may be configured to transmit electrical signals from the IC substrate 210 to the thermal detector array substrate 230 or vice-versa. For example, the couplings 324 may transmit the thermal detection signal from the thermal detector array 240 to the temperature control module 280 and/or the temperature control signal from the temperature control module 280 to the IC 220.

Figure 4:
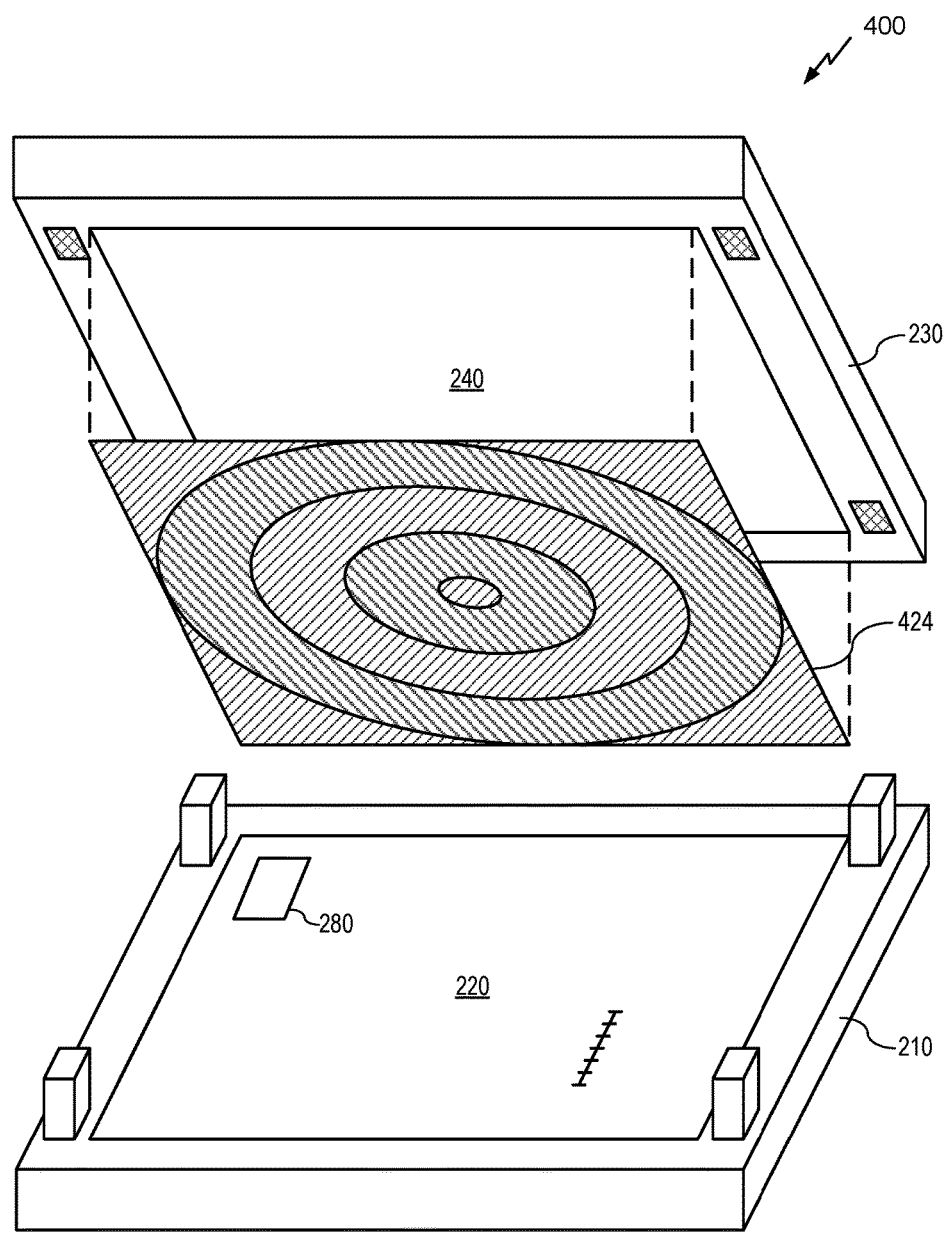
FIG. 4 generally illustrates yet another IC package in accordance with aspects of the disclosure.

FIG. 4 generally illustrates yet another IC package 400 in accordance with aspects of the disclosure. The IC package 400 may have a number of components in common with the IC package 200 depicted in FIG. 2. For example, the IC package 400 may include the IC substrate 210, the IC 220, the thermal detector array substrate 230, the thermal detector array 240, and the temperature control module 280. For clarity of illustration, reference numerals for other common components, such as the one or more spacers 221, 222, 223, 224, have been omitted. The IC package 400 differs from the IC package 200 in that it includes a lens 424. In some implementations, the lens 424 may be a Fresnel lens.

As noted above, the heights of the one or more spacers 221, 222, 223, 224 depicted in FIG. 2 may be selected to ensure that the thermal detector array 240 is at a particular distance from the IC 220. Accordingly, the arrangement of FIG. 2 enables proximity focusing, such that a thermal map having high spatial resolution is provided. In the arrangement of FIG. 4, by contrast, the lens 424 may be interposed between the IC 220 and the thermal detector array 240, and may be configured to focus a thermal image projected by the IC 220 or a portion thereof onto the thermal detector array 240, such that a thermal map having high spatial resolution is provided.

Figure 5:
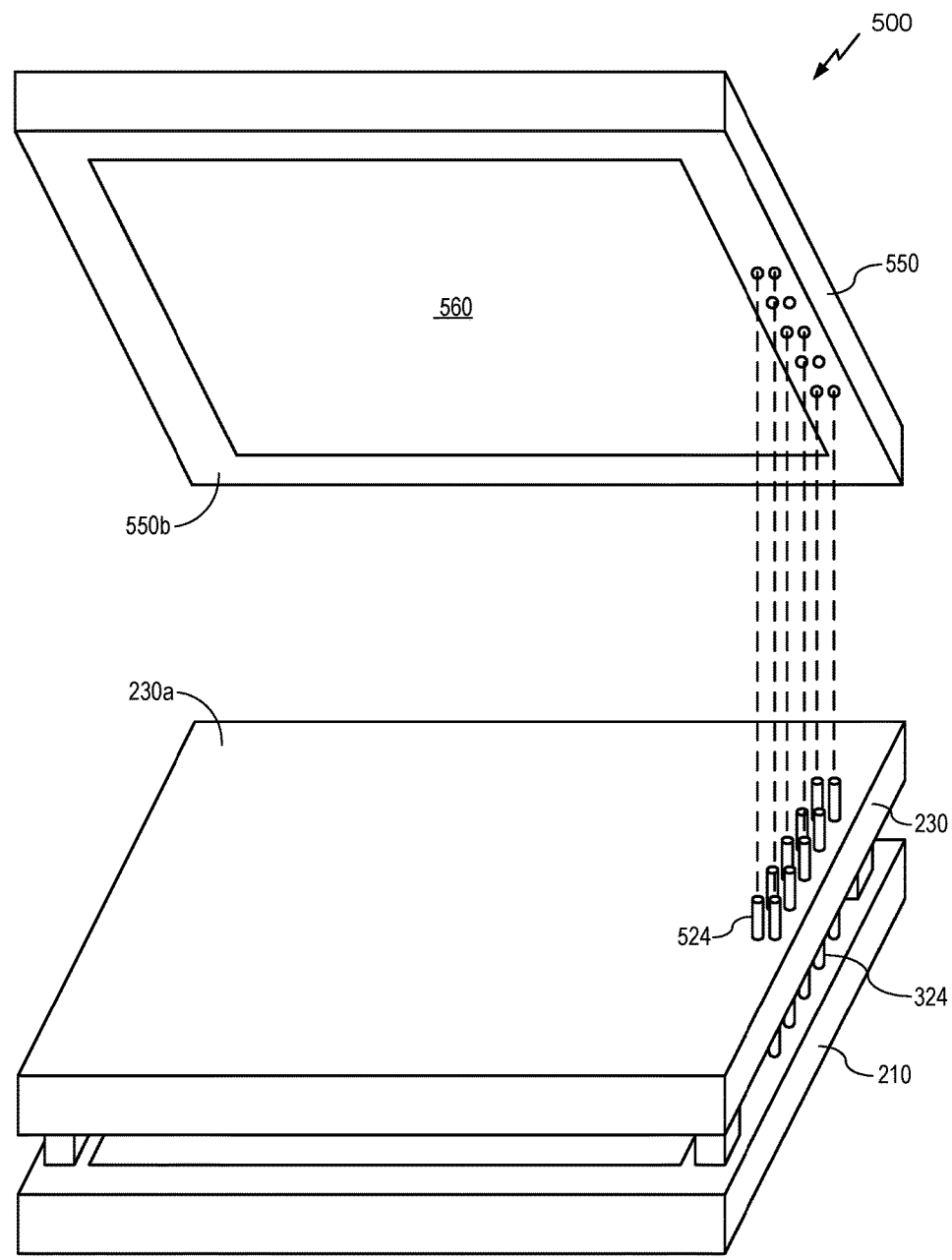
FIG. 5 generally illustrates yet another IC package in accordance with aspects of the disclosure.

FIG. 5 generally illustrates yet another IC package 500 in accordance with aspects of the disclosure. The IC package 500 may have a number of components in common with the IC package 200 depicted in FIG. 2. For example, the IC package 500 may include the IC substrate 210, the IC 220, the thermal detector array substrate 230, the thermal detector array 240, and the temperature control module 280. For clarity of illustration, reference numerals for other common components, such as the one or more spacers 221, 222, 223, 224, have been omitted. The IC package 500 differs from the IC package 200 in that it includes a memory circuit substrate 550 and a memory circuit 560, wherein the memory circuit 560 is disposed on the memory circuit substrate 550.

As depicted in FIG. 5, the memory circuit 560 is disposed on a memory circuit substrate bottom surface 550*b* of the memory circuit substrate 550, however, it will be understood that the memory circuit 560 may be disposed anywhere on the memory circuit substrate 550. The IC package 500 may further include couplings 524 for transmitting electrical signals to and from the thermal detector array substrate 230 and/or through the thermal detector array substrate 230 (i.e., to and from the IC substrate 210).

Figure 6:
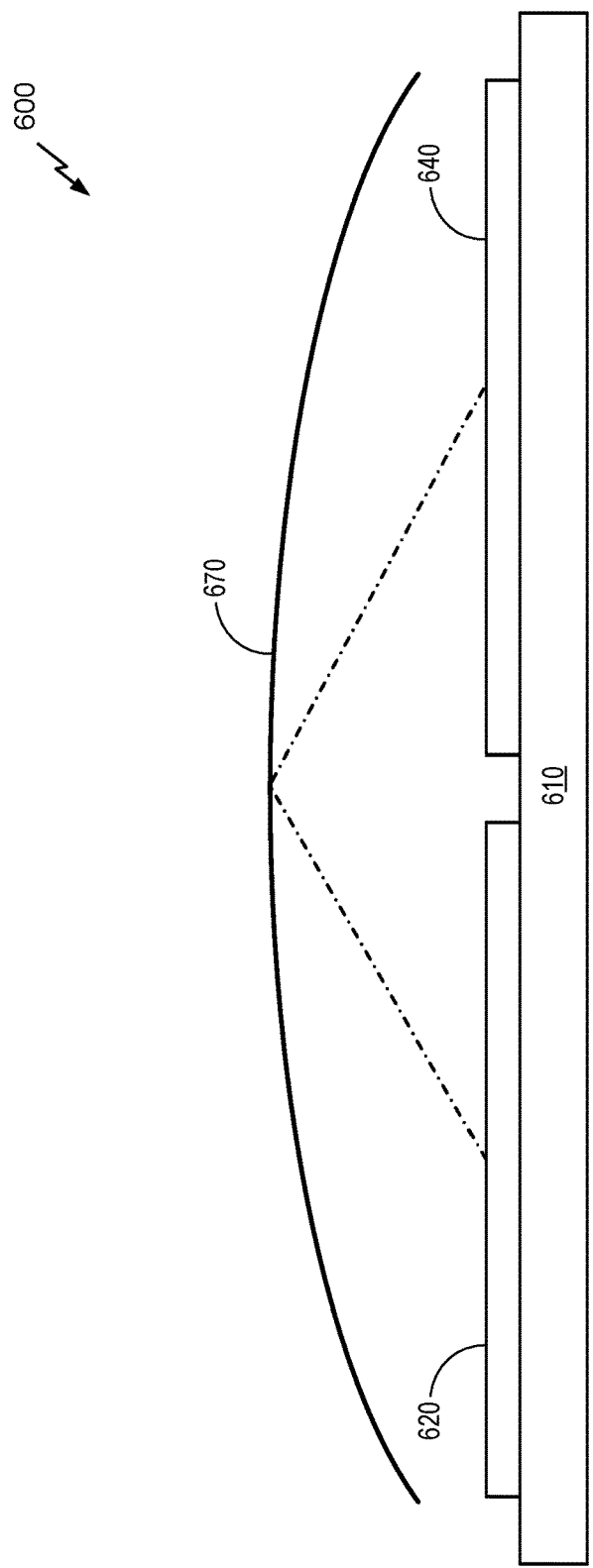
FIG. 6 generally illustrates yet another IC package in accordance with aspects of the disclosure.

FIG. 6 generally illustrates yet another IC package 600 in accordance with aspects of the disclosure. The IC package 600 may include a substrate 610. An IC 620 (analogous to the IC 220) and a thermal detector array 640 (analogous to the thermal detector array 240) may both be disposed on the substrate 610, for example, on a top surface thereof. The IC package 600 may further include a mirror 670.

The mirror 670 may have a reflective bottom surface and may be disposed at a particular distance from the IC 620 and the thermal detector array 640. The distance may be selected such that thermal radiation from a particular point on the IC 620 is reflected by the mirror 670 onto a corresponding point on the thermal detector array 640. In this manner, the thermal detector array 640 may provide a thermal map having high spatial resolution.

The IC package 600 may further include one or more spacers (not shown) disposed between the substrate 610 and the mirror 670. The heights of the one or more spacers may be selected such that thermal radiation from the particular point on the IC 620 is reflected by the mirror 670 onto the corresponding point on the thermal detector array 640 (as described above).

Although the mirror 670 is depicted as an elliptical mirror, it will be understood that any suitable mirror may be used, so long as thermal radiation from the particular point on the IC 620 is reflected by the mirror 670 onto the corresponding point on the thermal detector array 640, thereby enabling the thermal detector array 640 to provide a thermal map having high spatial resolution.

Figure 7:
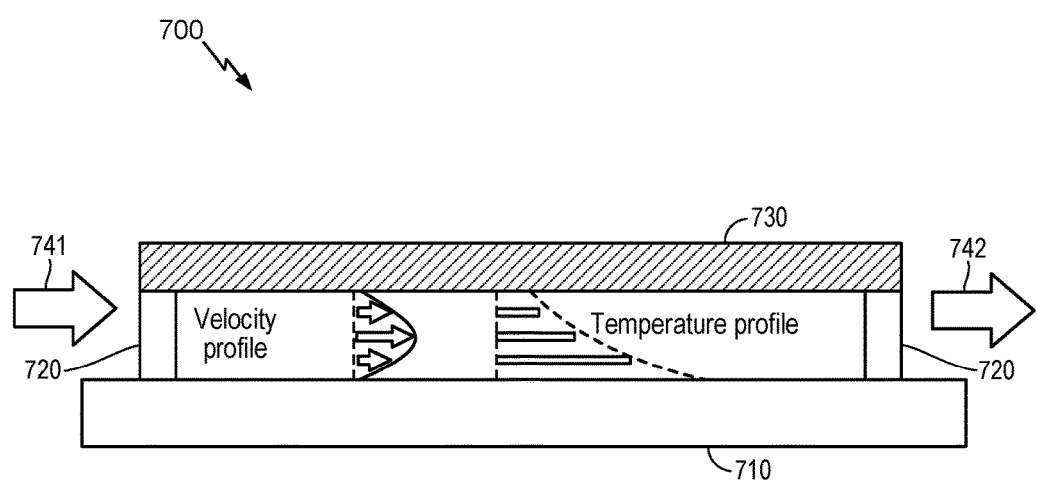
FIG. 7 generally illustrates fluid flow through an IC package in accordance with aspects of the disclosure.

FIG. 7 generally illustrates fluid flow through an IC package 700 in accordance with aspects of the disclosure. The IC package arrangement 700 may include an IC substrate 710 (analogous to the IC substrate 210) and a thermal detector array substrate 730 (analogous to the thermal detector array substrate 230). The IC substrate 710 may include an IC (not shown) and the thermal detector array substrate 730 may include a thermal detector array (not shown). The IC and thermal detector array may be analogous to the IC 220 and thermal detector array 240, and may be arranged as depicted in FIGS. 2-5. The IC package arrangement 700 may further include one or more spacers 720. In some implementations, the one or more spacers 720 may serve to seal off the area between the IC substrate 710 and the thermal detector array substrate 730.

FIG. 7 depicts a temperature profile of the IC substrate 710 (and/or the IC disposed thereon). As will be understood from FIG. 7, a heat source may be located in one or more particular locations on the IC substrate 710, and there may be a strong temperature profile at the one or more particular locations. As the distance from the IC substrate 710 increases, the thermal profile may become weaker.

FIG. 7 further depicts a fluid flow profile through the space between the IC substrate 710 and the thermal detector array substrate 730. The fluid flow may be provided as an implementation of the active coolant system, and the temperature control signal may (as described above) may direct fluid to flow through the space between the IC substrate 710 and the thermal detector array substrate 730. For example, the space may include an inflow 741 and an outflow 742 of cooling fluid. When heat is detected, the temperature control signal may direct the active coolant system to increase the inflow 741 and the outflow 742. As the fluid flow increases, more heat is absorbed from the surface of the IC substrate 710 and conducted to the outflow 742. In this manner, the active coolant system can react to detection of heat accumulation by providing active cooling to a surface of the IC substrate 710.

It will be understood that FIG. 7 is a cross-section of the IC package arrangement 700. The one or more spacers 720 may each have a seal and a valve (not shown), such that the amount of fluid in the inflow 741 and the outflow 742 can be controlled. Moreover, there may be a large number of spacers with individually controllable valves. Accordingly, specific portions of the IC substrate 710 can be actively cooled in a selective manner.

Figure 8A:
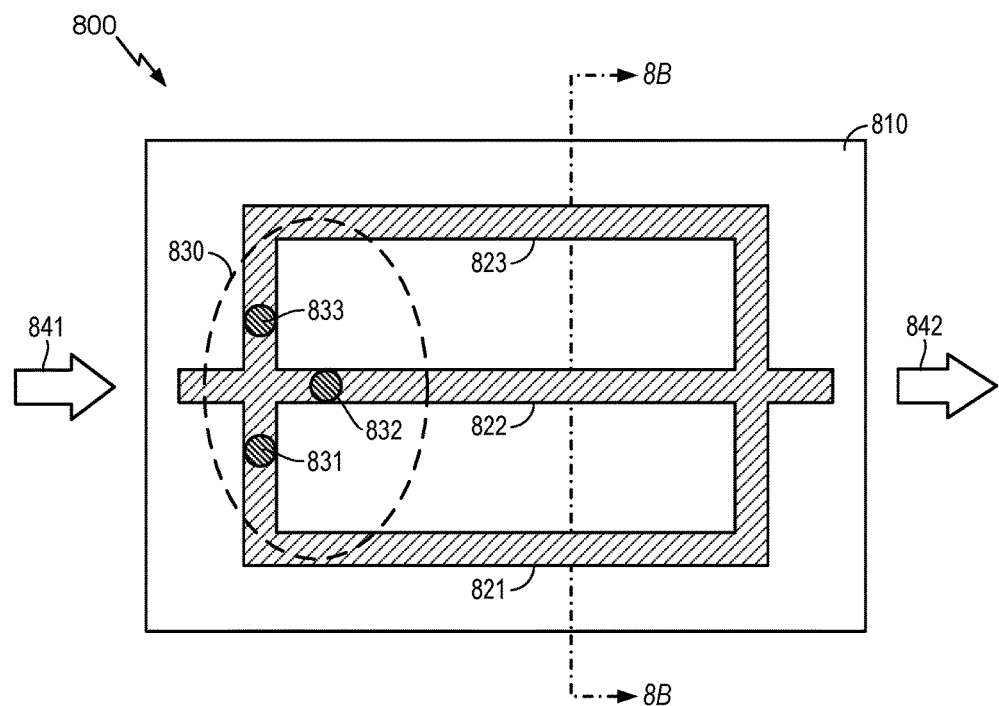
FIG. 8A generally illustrates fluid flow through microchannels of an IC package in accordance with aspects of the disclosure.

FIG. 8A generally illustrates fluid flow through microchannels of an IC package 800 in accordance with aspects of the disclosure. The IC package arrangement 800 may include an IC package 810. The IC package 810 may include one or more microchannels 820 and one or more valves 830. As depicted in FIG. 8A, there are three microchannels, a first microchannel 821, a second microchannel 822, and a third microchannel 823, however, it will be understood that the one or more microchannels 820 may include any number of microchannels. Each of the one or more microchannels 820 may include a corresponding valve, for example, a first valve 831 corresponding to the first microchannel 821, a second valve 832 corresponding to the second microchannel 822, and a third valve 833 corresponding to the third microchannel 823. The IC package 810 may further include an inflow 841 (analogous to the inflow 741) and an outflow 842 (analogous to the outflow 742).

Figure 8B:
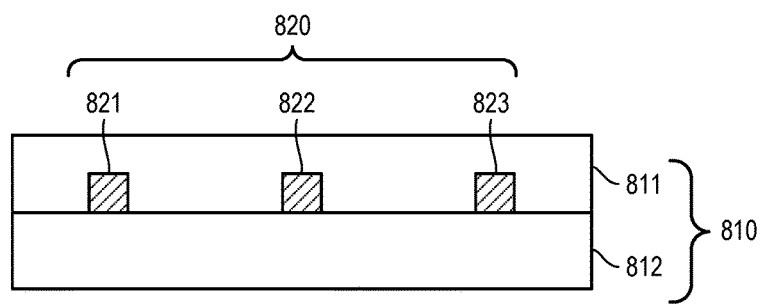
FIG. 8B generally illustrates a cross-sectional view of the IC package of FIG. 8A.

FIG. 8B generally illustrates a cross-sectional view of the IC package 800 of FIG. 8A. The IC package 810 may include an IC substrate layer 811 and an IC active layer 812. An IC (analogous to the IC 220) may be fabricated within the IC active layer 812. The one or more microchannels 820 may be fabricated within the IC substrate layer 811. Accordingly, if heat accumulates within the IC active layer 812, an active coolant system may direct fluid to flow through the one or more microchannels 820 by opening the one or more valves 830. Additionally or alternatively, if heat accumulates in a particular portion of the IC active layer 812, the active coolant system may direct fluid to flow through a particular microchannel associated with the particular portion of the IC active layer 812 in which the heat is accumulating.

Figure 9:
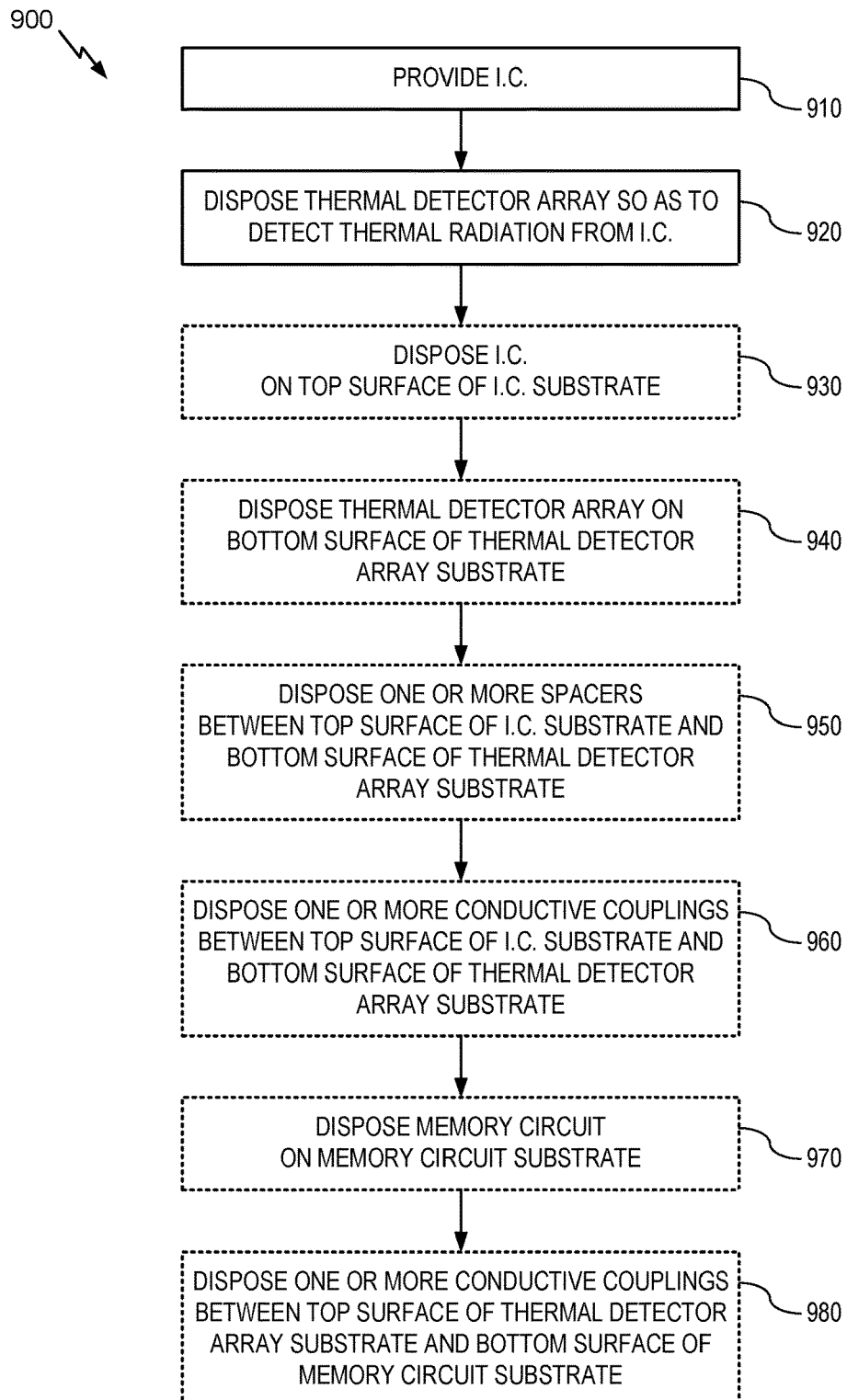
FIG. 9 generally illustrates a method for manufacturing an IC package in accordance with aspects of the disclosure.

FIG. 9 generally illustrates a method 900 for manufacturing an IC package in accordance with aspects of the disclosure. The method 900 may be performed in order to manufacture the IC package 200, the IC package 300, the IC package 400, and/or the IC package 500 depicted in FIGS. 2-5.

At 910, the method 900 provides an IC. The IC may be analogous to the IC 220 depicted in FIGS. 2-5.

At 920, the method 900 optionally disposes the IC provided at 910 on a top surface of an IC substrate. The IC substrate may be analogous to the IC substrate 210 depicted in FIGS. 2-5.

At 930, the method 900 optionally disposes a thermal detector array on a bottom surface of a thermal detector array substrate. The thermal detector array may be analogous to the thermal detector array 240 depicted in FIGS. 2-5 and the thermal detector array substrate may be analogous to the thermal detector array substrate 230 depicted in FIGS. 2-5.

At 940, the method 900 disposes the thermal detector array so as to detect thermal radiation from the IC provided at 910. The disposing at 940 may include arranging the thermal detector array in a manner similar to any of the arrangements depicted in FIGS. 2-5.

At 950, the method 900 optionally disposes one or more spacers between a top surface of the IC substrate and a bottom surface of the thermal detector array substrate. The one or more spacers may be analogous to the one or more spacers 221, 222, 223, 224 depicted in FIGS. 2-5.

At 960, the method 900 optionally disposes one or more conductive couplings between the top surface of the IC substrate and the bottom surface of the thermal detector array substrate. The one or more conductive couplings may be analogous to the couplings 324 depicted in FIG. 3. Additionally or alternatively, the one or more conductive couplings may be included in one or more of the one or more spacers 221, 222, 223, 224.

At 970, the method 900 optionally disposes a memory circuit on a memory circuit substrate. The memory circuit may be analogous to the memory circuit 560 depicted in FIG. 5 and the memory circuit substrate may be analogous to the memory circuit substrate 550 depicted in FIG. 5.

At 980, the method 900 optionally disposes one or more conductive couplings between a top surface of the thermal detector array substrate and a bottom surface of the memory circuit substrate. The one or more conductive couplings may be analogous to the one or more couplings 524 depicted in FIG. 5.

Figure 10:
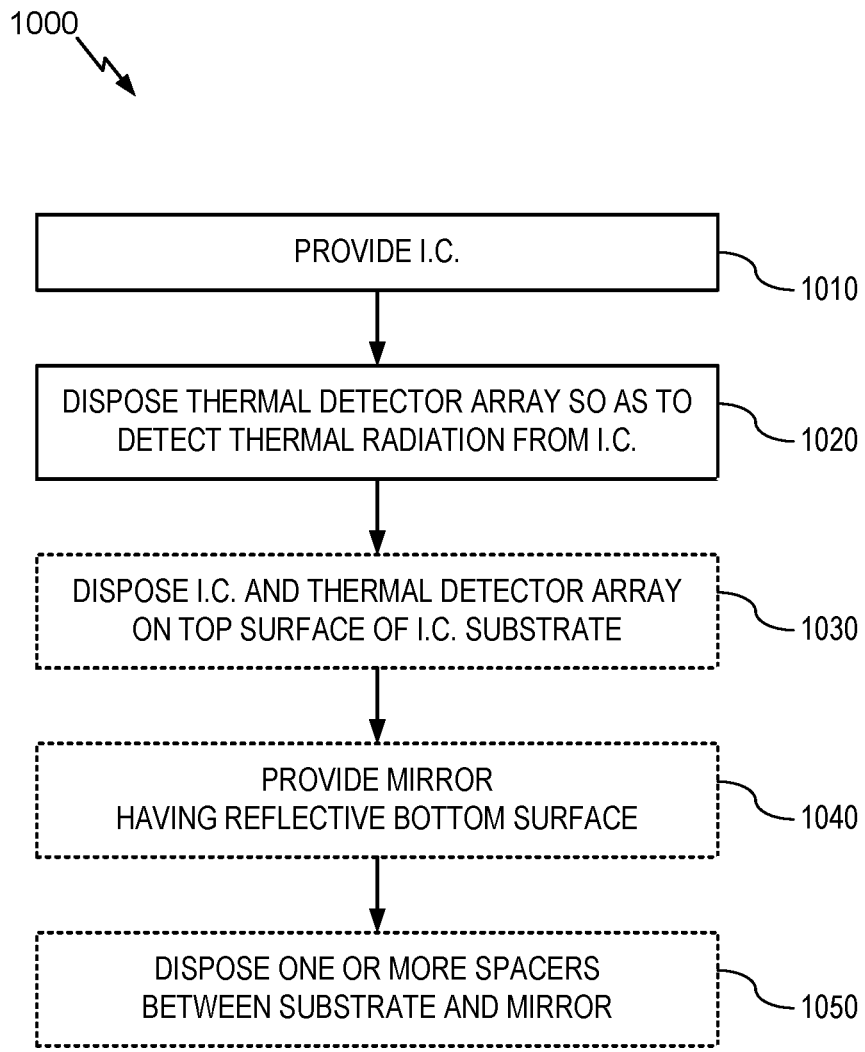
FIG. 10 generally illustrates another method for manufacturing an IC package in accordance with aspects of the disclosure.

FIG. 10 generally illustrates another method 1000 for manufacturing an IC package in accordance with aspects of the disclosure. The method 1000 may be performed in order to manufacture the IC package 600 depicted in FIG. 6.

At 1010, the method 1000 provides an IC. The IC may be analogous to the IC 620 depicted in FIG. 6.

At 1020, the method 1000 optionally disposes the IC and a thermal detector array on a top surface of a substrate. The thermal detector array may be analogous to the thermal detector array 640 depicted in FIG. 6 and the substrate may be analogous to the substrate 610 depicted in FIG. 6.

At 1030, the method 1000 optionally provides a mirror having a reflective bottom surface. The mirror may be analogous to the mirror 670 depicted in FIG. 7.

At 1040, the method 1000 disposes the thermal detector array so as to detect thermal radiation from the IC provided at 1010. The disposing at 1040 may include arranging the thermal detector array in a manner similar to the arrangement depicted in FIG. 6.

At 1050, the method 1000 optionally disposes one or more spacers between the substrate and the mirror provided at 1030.

Figure 11:
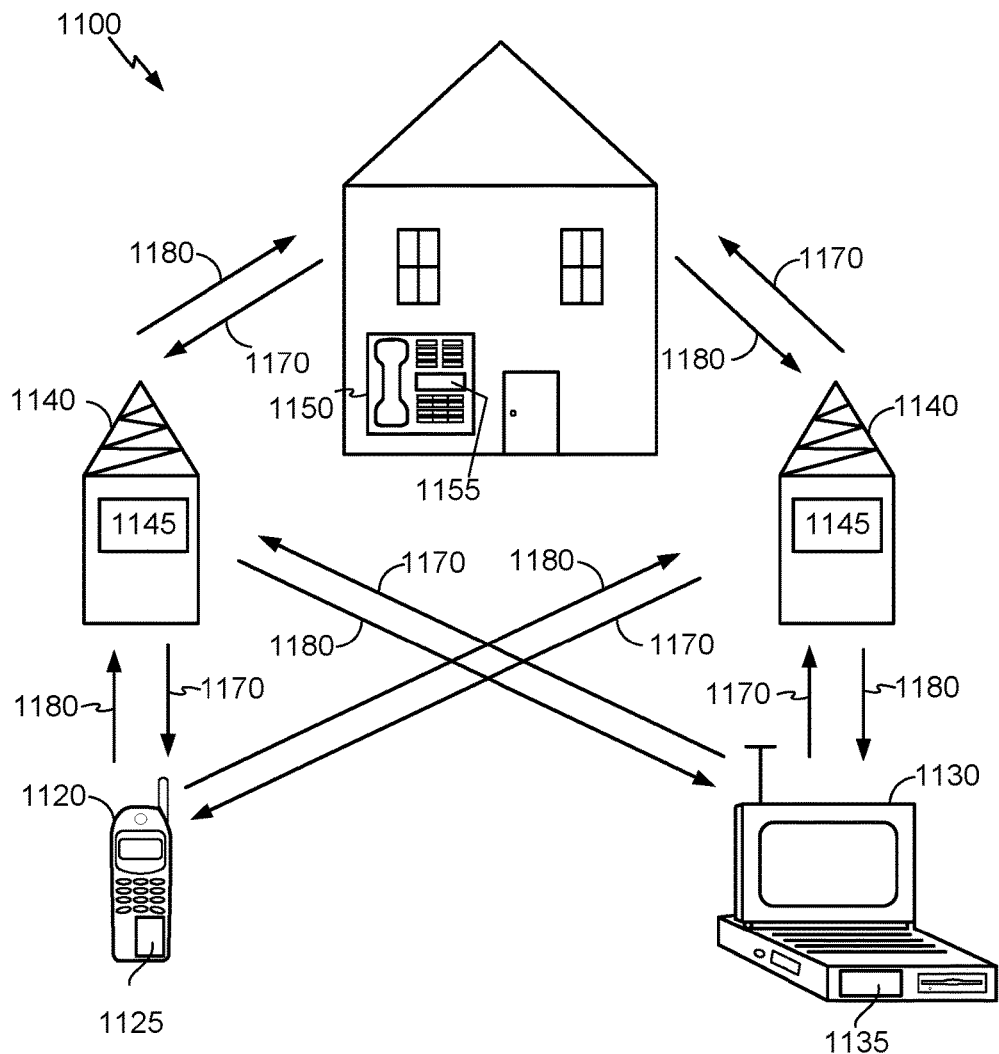
FIG. 11 generally illustrates a wireless communication system in which an aspect of the disclosure may be advantageously employed.

FIG. 11 generally illustrates a wireless communication system 1100 in which an aspect of the disclosure may be advantageously employed. For purposes of illustration, FIG. 11 shows three remote units 1120, 1130, and 1150 and two base stations 1140. It will be recognized that wireless communication systems may have many more remote units and base stations. Remote units 1120, 1130, and 1150 include IC devices 1125, 1135 and 1155, as disclosed below. The base stations 1140 may also include IC devices 1145. It will be recognized that any device containing an IC may also include semiconductor components having the disclosed features and/or components manufactured by the processes disclosed here, including the base stations, switching devices, and network equipment. FIG. 11 shows forward link signals 1180 from the base station 1140 to the remote units 1120, 1130, and 1150 and reverse link signals 1170 from the remote units 1120, 1130, and 1150 to base stations 1140.

In FIG. 11, the remote unit 1120 is shown as a mobile telephone, the remote unit 1130 is shown as a portable computer, and the remote unit 1150 is shown as a fixed location remote unit in a wireless local loop system. For example, remote units may be a device such as a music player, a video player, an entertainment unit, a navigation device, a communications device, a personal digital assistant (PDA), a fixed location data unit, and a computer. Although FIG. 11 illustrates remote units according to the teachings of the disclosure, the disclosure is not limited to these exemplary illustrated units. The disclosure may be suitably employed in any device which includes semiconductor components, as described below.

The multiplexers disclosed herein may be included in a device such as a set top box, a music player, a video player, an entertainment unit, a navigation device, a communications device, a personal digital assistant (PDA), a fixed location data unit, or a computer.

Figure 12:
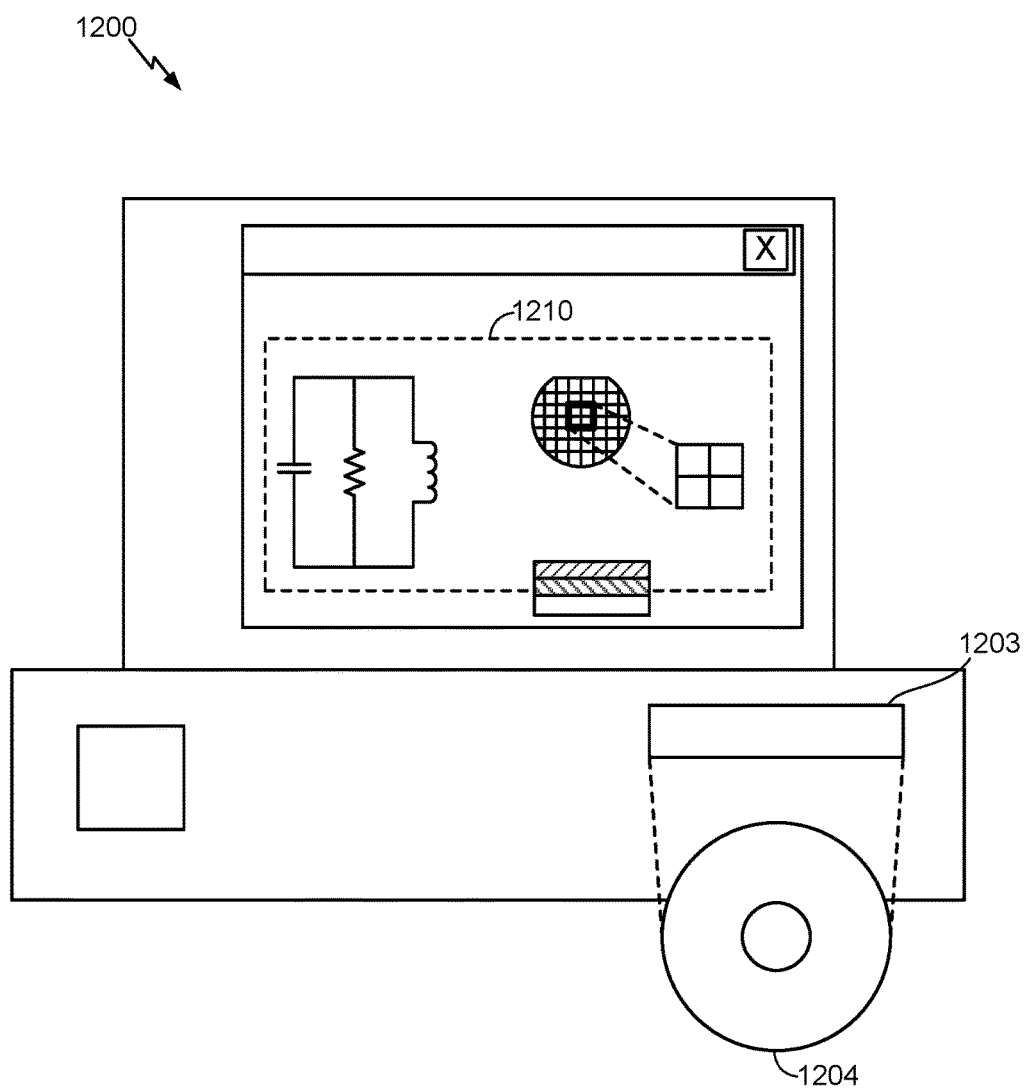
FIG. 12 generally illustrates a design workstation used for circuit, layout, and logic design of the disclosed semiconductor IC package.

FIG. 12 generally illustrates a design workstation 1200 used for circuit, layout, and logic design of the disclosed semiconductor IC package. The design workstation 1200 may include a hard disk containing operating system software, support files, and design software such as Cadence or OrCAD. The design workstation 1200 also includes a display to facilitate design of a semiconductor part 1210 that may include a circuit and semiconductor dies. A storage medium 1204 is provided for tangibly storing the semiconductor part 1210. The semiconductor part 1210 may be stored on the storage medium 1204 in a file format such as GDSII or GERBER. The storage medium 1204 may be a CD-ROM, DVD, hard disk, flash memory, or other appropriate device. Furthermore, the design workstation 1200 includes a drive apparatus 1203 for accepting input from or writing output to the storage medium 1204.

Data recorded on the storage medium 1204 may specify logic circuit configurations, pattern data for photolithography masks, or mask pattern data for serial write tools such as electron beam lithography. Providing data on the storage medium 1204 facilitates the design of the semiconductor part 1210 by decreasing the number of processes for designing circuits and semiconductor dies.

The foregoing description may have references to discrete elements or properties, such as a capacitor, capacitive, a resistor, resistive, an inductor, inductive, conductor, conductive and the like. However, it will be appreciated that the various aspects disclosed herein are not limited to specific elements and that various components, elements or portions of components or elements may be used to achieve the functionality of one or more discrete elements or properties. For example, a capacitive component or capacitive element may be a discrete device or may be formed by a specific arrangement of conductive traces separated by a dielectric material or combinations thereof. Likewise, an inductive component or inductive element may be a discrete device or may be formed by a specific arrangement of conductive traces and materials (e.g., air core, magnetic, paramagnetic, etc.) or combinations thereof. Similarly, a resistive component or resistive element may be a discrete device or may be formed by a semiconductor material, insulating material, adjusting the length and/or cross-sectional area of conductive traces, or combinations thereof. Moreover, a specific arrangement of conductive traces and materials may provide one or more resistive, capacitive or inductive functions. Accordingly, it will be appreciated that the various components or elements disclosed herein are not limited to the specific aspects and or arrangements detailed, which are provided merely as illustrative examples.

While the foregoing disclosure shows illustrative aspects of the disclosure, it should be noted that various changes and modifications could be made herein without departing from the scope of the invention as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An apparatus comprising:
an integrated circuit substrate;
an integrated circuit, wherein the integrated circuit is disposed on a top surface of the integrated circuit substrate;
a thermal detector array substrate;
a thermal detector array configured to detect thermal radiation from the integrated circuit, wherein the thermal detector array is disposed on a bottom surface of the thermal detector array substrate; and
one or more spacers disposed on the top surface of the integrated circuit substrate;
wherein the one or more spacers are disposed between the top surface of the integrated circuit substrate and the bottom surface of the thermal detector array substrate.

2. The apparatus of claim 1, wherein a distance between a top surface of the integrated circuit and a bottom surface of the thermal detector array is within a range of distances between twenty micrometers and one-thousand micrometers.

3. The apparatus of claim 1, further comprising:
a lens disposed between the top surface of the integrated circuit and a bottom surface of the thermal detector array.

4. The apparatus of claim 1, further comprising a temperature control module configured to:

receive a thermal detection signal from the thermal detector array, the thermal detection signal indicating an amount and/or location of thermal radiation detected by the thermal detector array;

generate a temperature control signal in response to receiving of the thermal detection signal; and transmit the temperature control signal to the integrated circuit, a portion or component of the integrated circuit, an active coolant system, or any combination thereof.

5. The apparatus of claim 4, wherein the temperature control signal comprises one or more instructions for reducing heat generation, one or more instructions for directing an active coolant system, or any combination thereof.

6. The apparatus of claim 1, wherein the apparatus is incorporated into a set top box, a music player, a video player, an entertainment unit, a navigation device, a communications device, a personal digital assistant (PDA), a fixed location data unit, or a computer, or any combination thereof.

7. An apparatus comprising:
an integrated circuit substrate;
an integrated circuit, wherein the integrated circuit is disposed on a top surface of the integrated circuit substrate;
a thermal detector array substrate;
a thermal detector array configured to detect thermal radiation from the integrated circuit; and
one or more conductive couplings disposed between the integrated circuit substrate and the thermal detector array substrate;
wherein the one or more conductive couplings are configured to conduct a thermal detection signal from the thermal detector array substrate to the integrated circuit substrate, the thermal detection signal indicating an amount and/or location of thermal radiation detected by the thermal detector array.

8. An apparatus comprising:
an integrated circuit substrate;
an integrated circuit, wherein the integrated circuit is disposed on a top surface of the integrated circuit substrate;
a thermal detector array substrate;
a thermal detector array configured to detect thermal radiation from the integrated circuit;
a memory circuit substrate;
a memory circuit, wherein the memory circuit is disposed on the memory circuit substrate; and
one or more conductive couplings disposed on a top surface of the thermal detector array substrate and a bottom surface of the memory circuit substrate.

9. An apparatus comprising:
an integrated circuit;
a thermal detector array;
a substrate, wherein the integrated circuit and the thermal detector array are disposed on a top surface of the substrate;
a mirror having a reflective bottom surface;
one or more spacers disposed between the substrate and the mirror.

10. A method comprising:
providing an integrated circuit;
disposing the integrated circuit on a top surface of an integrated circuit substrate;
providing a thermal detector array;
disposing the thermal detector array on a bottom surface of a thermal detector array substrate so as to detect thermal radiation from the integrated circuit;

disposing one or more spacers on the top surface of the integrated circuit substrate, wherein disposing the one or more spacers comprises disposing the one or more spacers between the top surface of the integrated circuit substrate and the bottom surface of the thermal detector array substrate.

11. The method of claim 10, wherein disposing the one or more spacers comprises:
disposing a top surface of the integrated circuit at a distance from a bottom surface of the thermal detector array, wherein the distance is within a range of distances between twenty micrometers and one-thousand micrometers.

12. The method of claim 10, further comprising:
disposing a lens between the top surface of the integrated circuit and a bottom surface of the thermal detector array.

13. The method of claim 10, further comprising:
receiving a thermal detection signal from the thermal detector array, the thermal detection signal indicating an amount and/or location of thermal radiation detected by the thermal detector array;
generating a temperature control signal in response to receiving of the thermal detection signal; and
transmitting the temperature control signal to the integrated circuit, a component of the integrated circuit, or any combination thereof.

14. The method of claim 13, wherein the temperature control signal comprises one or more instructions for reducing heat generation, one or more instructions for directing a flow of cooling fluid, or any combination thereof.

15. The method of claim 10, wherein the method further comprises incorporating the thermal detector array into a set top box, a music player, a video player, an entertainment unit, a navigation device, a communications device, a personal digital assistant (PDA), a fixed location data unit, or a computer, or any combination thereof.

16. A method comprising:
providing an integrated circuit;
disposing the integrated circuit on a top surface of an integrated circuit substrate;
providing a thermal detector array;
disposing the thermal detector array on a bottom surface of a thermal detector array substrate so as to detect thermal radiation from the integrated circuit;
disposing one or more conductive couplings between the integrated circuit substrate and the thermal detector array substrate;
conducting a thermal detection signal from the thermal detector array substrate to the integrated circuit substrate via the one or more conductive couplings, the thermal detection signal indicating an amount and/or location of thermal radiation detected by the thermal detector array.

17. A method comprising:
providing an integrated circuit;
disposing the integrated circuit on a top surface of an integrated circuit substrate;
providing a thermal detector array;
disposing the thermal detector array on a bottom surface of a thermal detector array substrate so as to detect thermal radiation from the integrated circuit;
providing a memory circuit;
disposing the memory circuit on a memory circuit substrate; and disposing one or more conductive couplings on a top surface of the thermal detector array substrate and a bottom surface of the memory circuit substrate.

18. A method comprising:
providing an integrated circuit;
providing a thermal detector array configured to detect thermal radiation from the integrated circuit;
disposing the integrated circuit and the thermal detector array on a top surface of a substrate;
providing a mirror having a reflective bottom surface;
disposing one or more spacers between the substrate and the mirror.

19. An apparatus comprising:
means for processing;
means for supporting the means for processing, wherein the means for processing is disposed on a top surface of the means for supporting the means for processing;
means for detecting thermal radiation from the means for processing;
means for supporting the means for detecting thermal radiation, wherein the means for detecting thermal radiation is disposed on a bottom surface of the means for supporting the means for detecting thermal radiation; and
means for spacing disposed on the top surface of the means for supporting the means for processing;
wherein the means for spacing are disposed between the top surface of the means for supporting the means for processing and the bottom surface of the means for supporting the means for detecting thermal radiation.

20. The apparatus of claim 19, further comprising a means for controlling temperature configured to:
receive a thermal detection signal from the means for detecting thermal radiation, the thermal detection signal indicating an amount and/or location of thermal radiation detected by the means for detecting thermal radiation;
generate a temperature control signal in response to receiving of the thermal detection signal; and
transmit the temperature control signal to the means for processing, a component of the means for processing, or any combination thereof.

21. The apparatus of claim 20, wherein the temperature control signal comprises one or more instructions for reducing heat generation, one or more instructions for directing a flow of cooling fluid, or any combination thereof.

22. An apparatus comprising:
means for processing;
means for supporting the means for processing, wherein the means for processing is disposed on a top surface of the means for supporting the means for processing;
means for detecting thermal radiation from the means for processing;
means for supporting the means for detecting thermal radiation; and
means for conductively coupling disposed between the means for supporting the means for processing and the means for supporting the means for detecting thermal radiation;
wherein the means for conductively coupling is configured to conduct a thermal detection signal from the means for supporting the means for detecting thermal radiation to the means for supporting the means for processing, the thermal detection signal indicating an amount and/or location of thermal radiation detected by the means for detecting thermal radiation.

23. An apparatus comprising:
means for processing;
means for supporting the means for processing, wherein the means for processing is disposed on a top surface of the means for supporting the means for processing;
means for detecting thermal radiation from the means for processing;
means for supporting the means for detecting thermal radiation; and
means for storing data;
means for supporting the means for storing data, wherein the means for storing data is disposed on the means for supporting the means for storing data; and
means for conductively coupling disposed on a top surface of the means for supporting the means for detecting thermal radiation and a bottom surface of the means for supporting the means for storing data.

24. An apparatus comprising:
means for processing;
means for detecting thermal radiation from the means for processing;
means for supporting, wherein the means for processing and the means for detecting thermal radiation are disposed on a top surface of the means for supporting;
means for reflecting; and
means for spacing disposed between the means for supporting and the means for reflecting.

* * * * *